«12» United States Patent
Hirano et al.

(10) Patent No.: US 7,867,935 B2
(45) Date of Patent: Jan. 11, 2011

(54) INSULATOR HAVING EXCELLENT ARC RESISTANCE

(75) Inventors: Yoshihiko Hirano, Tokyo (JP); Norimitsu Kato, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 74 days.

(21) Appl. No.: 12/064,798

(22) PCT Filed: Aug. 25, 2006

(86) PCT No.: PCT/JP2006/316759

§ 371 (c)(1),
(2), (4) Date: Jun. 19, 2008

(87) PCT Pub. No.: WO2007/023956

PCT Pub. Date: Mar. 1, 2007

(65) Prior Publication Data

US 2009/0261308 A1    Oct. 22, 2009

(30) Foreign Application Priority Data

Aug. 26, 2005  (JP)  ............... 2005-246640

(51) Int. Cl.
*C04B 35/46* (2006.01)
*H01H 73/00* (2006.01)

(52) U.S. Cl. ............... 501/134; 252/567; 252/1; 252/62.3 ZT; 252/62.3 BT; 252/519.51; 252/520.21; 361/115

(58) Field of Classification Search ........ 252/567, 252/1, 62.3 ZT, 62.3 BT, 519.51, 520.21; 501/134; 361/115

See application file for complete search history.

(56) References Cited

U.S. PATENT DOCUMENTS

| | | |
|---|---|---|
| 5,925,862 A | 7/1999 | Zehnder et al. |
| 6,888,116 B2 * | 5/2005 | Dalton ............. 219/745 |
| 2001/0031334 A1 * | 10/2001 | Katsuda et al. ......... 428/65.3 |
| 2003/0209537 A1 * | 11/2003 | Dalton ............. 219/634 |
| 2003/0209538 A1 * | 11/2003 | Dalton ............. 219/634 |
| 2005/0026037 A1 * | 2/2005 | Riley et al. ......... 429/210 |
| 2006/0083694 A1 * | 4/2006 | Kodas et al. ......... 424/46 |
| 2006/0246149 A1 * | 11/2006 | Buchholz et al. ......... 424/603 |

FOREIGN PATENT DOCUMENTS

| | | |
|---|---|---|
| JP | 57-129116 A | 8/1982 |
| JP | 58-023130 A | 2/1983 |
| JP | 62-060783 A | 3/1987 |
| JP | 1-037822 B2 | 8/1989 |
| JP | 10-172400 A | 6/1998 |
| JP | 2004-115928 A | 4/2004 |
| JP | 2004-142129 A | 5/2004 |
| JP | 2004-142175 A | 5/2004 |
| JP | 2004-168619 A | 6/2004 |

OTHER PUBLICATIONS

Chapter II "The Details of Colorant, Pigment", paragraph 2 "General Properties", 2.7 "Hiding Power", Colorant Engineering Handbook, Japan Society of Color Material, Asakura Publishing Co., Ltd. 1989.

* cited by examiner

*Primary Examiner*—Douglas Mc Ginty
(74) *Attorney, Agent, or Firm*—Foley & Lardner LLP

(57) ABSTRACT

A highly heat-resistant fluororesin, such as tetrafluoroethylene resin or tetrafluoroethylene-perfluoroalkyl vinyl ether copolymer, is filled with 0.5 to 1 weight % of a non-black insulating pigment that has a heat resistance such that discoloration does not occur when the fluororesin is baked. Green insulating pigment whose main component is a $TiO_2$—CoO—NiO—ZnO system or a ZnO—CoO system, or blue insulating pigment whose main component is a $CoO$—$Al_2O_3$ system or a CoO—$Al_2O_3$—$Cr_2O_3$ system is used singly or in a combination, as the non-black insulating pigment. A highly arc-resistant insulator is provided that secures an insulating capacity and at the same time that secures an excellent ability to prevent both interior and exterior deterioration of the insulator and that avoids color heterogeneity and localized discoloration.

2 Claims, 6 Drawing Sheets

INSULATOR HAVING EXCELLENT ARC RESISTANCE

TECHNICAL FIELD

The present invention relates to a highly arc-resistant insulator and in particular relates to a highly arc-resistant insulator that is suitable for use in, for example, circuit breakers in which arcing is generated between electrodes.

BACKGROUND ART

In the case of devices in which arcing is generated between electrodes in the device, an insulator is disposed in the vicinity of the arcing in order to protect the other parts of the device from the heat and ultraviolet-rich light from the arcs. These devices can be exemplified by circuit breakers in which arcing is extinguished by spraying sulfur hexafluoride gas ($SF_6$ gas) between the electrodes and arc chute breakers in which a magnetic field is applied by coils disposed on both sides of the electrodes and arcing is extinguished by blowing sulfur hexafluoride gas into a region known as the arc chute.

Fluororesin not filled with another substance was used for this protective insulation in the past. However, when an unfilled fluororesin was used, the heat and ultraviolet-rich light from the arcing generated during circuit interruption produced an electrically conductive carbonized material not just on the surface of the resin, but also in the interior of the resin, causing a substantial reduction in the insulating performance.

In addition, gas generated by the resin's interior carbonization was discharged from the interior, causing ejection of the fluororesin. This resulted in the formation of substantial unevenness in the surface of the resin and a substantial decline in the mechanical strength of the insulator disposed for purposes of protection. Another problem was that the unevenness formed in the resin's surface resulted in a poor gas flow when the arc-extinguishing gas was blown in and prevented an adequate cooling effect from being obtained.

In response to these problems, Patent Document 1 proposes that the fluororesin be filled with boron nitride; this reflects the light from the arc and prevents its penetration into the interior of the resin and thereby prevents interior deterioration. Due to its filling with boron nitride, this insulator is whiter than the unfilled insulator and also has a higher light reflectance. However, a punctiform discoloration and color heterogeneity not seen for the boron nitride-free fluororesin by itself have been produced in some instances due, inter alia, to filling with a mixture of boron nitrides from different production lots and the residence in the resin of gas produced from the boron nitride during resin baking.

These discolored regions absorb heat and ultraviolet radiation from the arcing more readily than other regions, which, being white, have a higher reflectance, and this can cause local deterioration. Since as a consequence it must basically be ensured that an insulator that exhibits substantial color heterogeneity and/or regions of discoloration is not used, quality control becomes more problematic than for an insulator not filled with boron nitride, which drives up the cost of quality control and makes it difficult to improve production efficiency.

In addition, while materials obtained by loading a fluororesin with 10 to 20 weight % of boron nitride have entered into widespread use at the present time as insulators for circuit breaking applications, since boron nitride has a high thermal conductivity fluororesin loaded with 10 to 20% boron nitride ends up having a high thermal conductivity, which has led to the additional problem of an elevated heat-induced wear of the fluororesin.

The addition of molybdenum disulfide $MoS_2$ is proposed in Patent Document 2 in order to absorb the heat and ultraviolet-rich light from the arcing in the surface layer and thereby prevent interior deterioration. This method can almost entirely eliminate color heterogeneity and discoloration due to its blackening effect. However, both $MoS_2$ and carbon, which is widely used as a black pigment, are electroconductive materials, and as a consequence the insulating performance of the insulator and its arc resistance are reduced even when the filling rate is controlled.

The addition of 0.2 to 5 weight % of an inorganic pigment having a particle diameter no greater than 1 μm and/or organic pigment having a particle diameter of 0.5 μm is proposed in Patent Document 3. However, there is no stipulation of the resin/pigment combination, and the technology shown in Patent Document 3 (for example, filling a polytetrafluoroethylene resin, which requires baking at around 300° C., with an organic pigment having a heat resistance of only hundred and several tens degrees centigrade and/or with ultramarine blue pigment, which gradually discolors at temperatures of 300° C. and above, is taught therein) cannot solve the problem of color heterogeneity and discoloration, which is one of the problems that the present invention is directed to solving.

Patent Document 1: Japanese Patent Publication No. Hi-37822

Patent Document 2: Japanese Patent Application Laid-open No. H10-172400

Patent Document 3: Japanese Patent Publication No. S62-60783

Non-Patent Document 1: "Colorant Engineering Handbook", Japan Society of Color Material, Asakura Publishing Co., Ltd., 1989

DISCLOSURE OF THE INVENTION

As described above, it has not been possible with the insulators heretofore used in, for example, circuit breakers, to prevent a decline in insulating performance and/or a decline in arc resistance, nor has it been possible to prevent the generation of color heterogeneity and discoloration.

The present invention was pursued in order to solve these problems and has as an object the introduction, based on maintaining the insulation performance while preventing color heterogeneity and localized discoloration and securing a satisfactory capacity to prevent both interior and exterior of deterioration of the insulator, of a highly arc-resistant insulator that enables an improved consistency in product quality.

In order to achieve the aforementioned object, the highly arc-resistant insulator of one aspect of the present invention is an insulator that is disposed and used in the vicinity of arcing that is generated between electrodes, the insulator comprising a prescribed fluororesin filled with 0.5 to 1 weight % of a non-black insulating pigment that has a heat resistance such that discoloration does not occur when the fluororesin is baked, and the insulator is characterized in that the fluororesin is a polytetrafluoroethylene resin or a tetrafluoroethylene-perfluoroalkyl vinyl ether copolymer, and a pigment whose main component is either a $TiO_2$—CoO—NiO—ZnO system green insulating pigment, or a $CoO$—$Al_2O_3$—$Cr_2O_3$ system blue insulating pigment is used singly or in combination, as the non-black insulating pigment.

The highly arc-resistant insulator in another aspect of the present invention is an insulator that is disposed and used in the vicinity of arcing that is generated between electrodes, the insulator comprising a prescribed fluororesin filled with 0.05 to 0.2 weight % of a black insulating pigment that has a heat resistance such that discoloration does not occur when the fluororesin is baked, and the insulator is characterized in that the fluororesin is a polytetrafluoroethylene resin or a tetrafluoroethylene-perfluoroalkyl vinyl ether copolymer; and a pigment whose main component is any of a $CuO$—$Cr_2O_3$ system, a $CoO$—$Cr_2O_3$—$Mn_2O_3$ system, a $CoO$—$Fe_2O_3$—$Cr_2O_3$ system, or a $CuO$—$Fe_2O_3$—$Mn_2O_3$ system, is used, singly or in a combination, as the black insulating pigment.

In order to achieve the aforementioned object, the highly arc-resistant insulator of one aspect of the present invention is an insulator that is disposed and used in the vicinity of arcing that is generated between electrodes, the insulator comprising a prescribed fluororesin filled with 0.5 to 1 weight % of a non-black insulating pigment that has a heat resistance such that discoloration does not occur when the fluororesin is baked.

The highly arc-resistant insulator in another aspect of the present invention is an insulator that is disposed and used in the vicinity of arcing that is generated between electrodes, the insulator comprising a prescribed fluororesin filled with 0.05 to 0.2 weight % of a black insulating pigment that has a heat resistance such that discoloration does not occur when the fluororesin is baked.

The reduction in insulating performance caused by interior carbonization of the fluororesin can be prevented in an insulator having the characteristic features cited above through the absorption of the damaging light by the insulating pigment that has been introduced in very small amounts. In addition, because the thermal conductivity does not become elevated in this insulator, heat- and light-induced fluororesin wear can be reduced. Moreover, quality control can be made easy, quality control costs can be reduced and production efficiency can be improved because, through filling with a black or other colored pigment that absorbs the damaging light, substantial color heterogeneity and local discoloration can also be inhibited more effectively than when the insulator is whitened by filling with boron nitride. An improved consistency in product quality is thereby made possible. Furthermore, a high mechanical strength can be maintained since the insulating pigment is introduced at very low filling rates.

The present invention, by maintaining the insulation performance while preventing color heterogeneity and localized discoloration and securing a satisfactory capacity to prevent both interior and exterior deterioration of the insulator, can provide a highly arc-resistant insulator that enables an improved consistency in product quality.

EXPLANATION OF REFERENCE LETTERS

1: FLUORORESIN
2: NON-BLACK INSULATING PIGMENT
3: LIGHT FROM ARC
4: ARC
10: BLACK INSULATING PIGMENT

BEST MODE FOR CARRYING OUT THE INVENTION

Embodiments that apply the present invention are specifically described herebelow with reference to the drawings.

(1) First Embodiment (1-1) Structure

Figure 1:
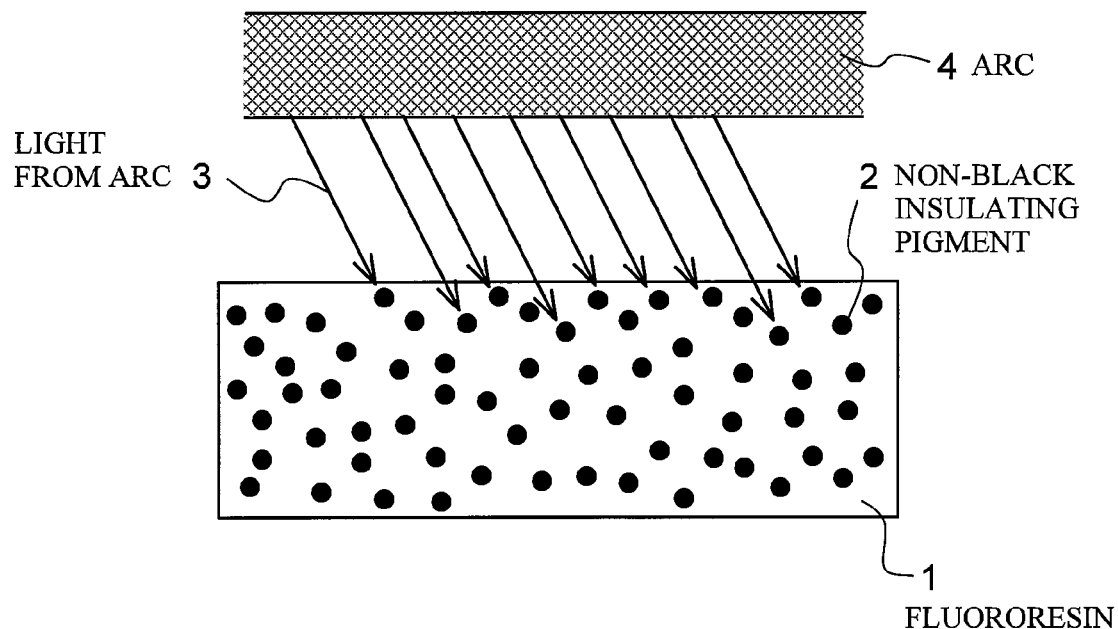
FIG. 1 is a schematic cross section that shows the structure of a first embodiment of the highly arc-resistant insulator according to the present invention.

As shown in FIG. 1, the highly arc-resistant insulator of this embodiment comprises a fluororesin 1 filled with a non-black, chemical-resistant insulating pigment 2 that has a heat resistance such that discoloration does not occur when the fluororesin is baked.

(Fluororesin)

The use of polytetrafluoroethylene resin and tetrafluoroethylene-perfluoroalkyl vinyl ether copolymer for the fluororesin 1 is particularly preferred. This is because polytetrafluoroethylene resin, with its melting point of about 327° C., and tetrafluoroethylene-perfluoroalkyl vinyl ether copolymer, with its melting point of about 302 to 310° C., have a high heat resistance even among the fluororesins.

Due to its high melt viscosity, polytetra-fluoroethylene resin is characterized by an ability to maintain its original shape even when melted at high temperature. By positioning the highly arc-resistant insulator of this embodiment while maintaining a suitable distance from the arcing, this property can be exploited to prevent heat-induced distortion even when arc-induced heating occurs.

Moreover, both the aforementioned polytetra-fluoroethylene resin and tetrafluoroethylene-perfluoroalkyl vinyl ether copolymer are converted by thermal degradation into the unit constituent molecules that comprise the polymer and are thereby converted into a gas; as a consequence, there is no residual carbonized material. This accrues the advantage of inhibiting the decline in insulating performance that is induced by the production of electroconductive material. In addition, a cooling effect is developed due to the large amount of energy consumed during degradative gasification, which has the additional effect of protecting the polytetrafluoroethylene resin itself or the tetrafluoroethylene-perfluoroalkyl vinyl ether copolymer itself.

(Non-Black Insulating Pigment)

The fluororesin 1 is filled with a non-black, chemical-resistant insulating pigment 2 that has a heat resistance such that discoloration does not occur when the fluororesin 1 is baked. This insulating pigment 2 inhibits the formation of carbonized material in the resin's interior by absorbing, from the light 3 produced from the arc 4, mainly light in the wavelength region that participates in interior deterioration and inhibits a reduction in insulating performance by preventing the fluororesin ejection induced by gas produced in the interior.

Thus, when filling is carried out using an electroconductive substance such as carbon, even at a low filling rate, for example, the insulation resistance of the fluororesin 1 is reduced and the adjacent arc can easily flow across the surface of the electroconductive material-filled fluororesin 1, and the arc resistance thus ends up being reduced. In contrast to this, when filling with the non-black insulating pigment 2 used in this embodiment is employed, there is no reduction in the insulation resistance of the fluororesin 1 and a highly arc-resistant insulating material can be obtained as a result.

The non-black insulating pigment 2 used in this embodiment is preferably a non-black insulating pigment 2 that has a heat resistance such that neither deformation nor discoloration occurs at around 300° C., which is the baking temperature for the fluororesin 1, and that has a chemical resistance such that the pigment is not attacked by the fluorine-containing gases generated from the fluororesin 1 pre-baking. The use of pigment lacking heat resistance or chemical resistance leads to a reduced insulating performance just as for the addition of electroconductive pigment, due to the generation of discoloration when the fluororesin is baked or the production of carbonized material.

(Specific Examples of the Non-Black Insulating Pigment)

The following are effective for blocking the light 3 from the arc and reducing the light absorption-induced wear of insulator, vide supra: rationalizing the filling rate of the non-black insulating pigment 2, as described below, and adjusting the wavelength region of the light absorbed by the non-black insulating pigment 2. Thus, the reasoning is that if mainly light in the wavelength region involved with interior carbonization were to be absorbed and light outside this wavelength region were not to be absorbed, then a highly arc-resistant insulator could be obtained that would accrue both of the following effects: an inhibition of a reduction in insulating performance induced by interior carbonization and a reduction in the light- and heat-induced wear of the fluororesin 1.

As a result of intensive and extensive investigations by the present inventors from this point of view, it was discovered that the use, singly or in a combination, of green pigment or blue pigment yields a highly arc-resistant insulator free of color heterogeneity and so forth and accrues both of the following effects: an inhibition of a reduction in insulating performance induced by interior carbonization and a reduction in the light- and heat-induced wear of the fluororesin 1.

The green color cited herein denotes the region comprising GY, G, and BG among the 10 principal hues in the Munsell wheel (hue) of the Munsell color system, while the blue color cited herein denotes the region comprising BG, B, and PB among the 10 principal hues of the Munsell wheel of the Munsell color system.

More specifically, pigment whose main component is a $TiO_2$—$CoO$—$NiO$—$ZnO$ system or a $ZnO$—$CoO$ system is preferably used as the green inorganic pigment and pigment whose main component is a $CoO$—$Al_2O_3$ system or a $CoO$—$Al_2O_3$—$Cr_2O_3$ system is preferably used as the blue inorganic pigment. These pigments are insulating pigments that exhibit an excellent heat resistance and an excellent chemical resistance and that when filled into the fluororesin 1 do not undergo distortion or discoloration when heated during baking.

Moreover, as noted above, the light- and heat-induced wear of the fluororesin 1 can be kept low by inhibiting interior carbonization through the effective absorption of the light that participates in interior deterioration and by not absorbing light other than that.

(Filling Rate for the Non-Black Insulating Pigment)

The filling rate for the non-black insulating pigment in the fluororesin will now be considered. Viewed from the perspective of countering color heterogeneity and discoloration in the highly arc-resistant insulator of this embodiment, there exists a color density sufficient for effectively preventing color heterogeneity and discoloration, that is, there exists a minimum filling rate. However, when the non-black insulating pigment 2 is introduced in large amounts, the light 3 from the arc is absorbed in large amounts and its conversion into thermal energy then produces thermal degradation and thermal deterioration. This results in an increase in the wear of the insulator comprising the fluororesin 1. An appropriate color and amount must therefore be set for the added pigment.

Figure 2:
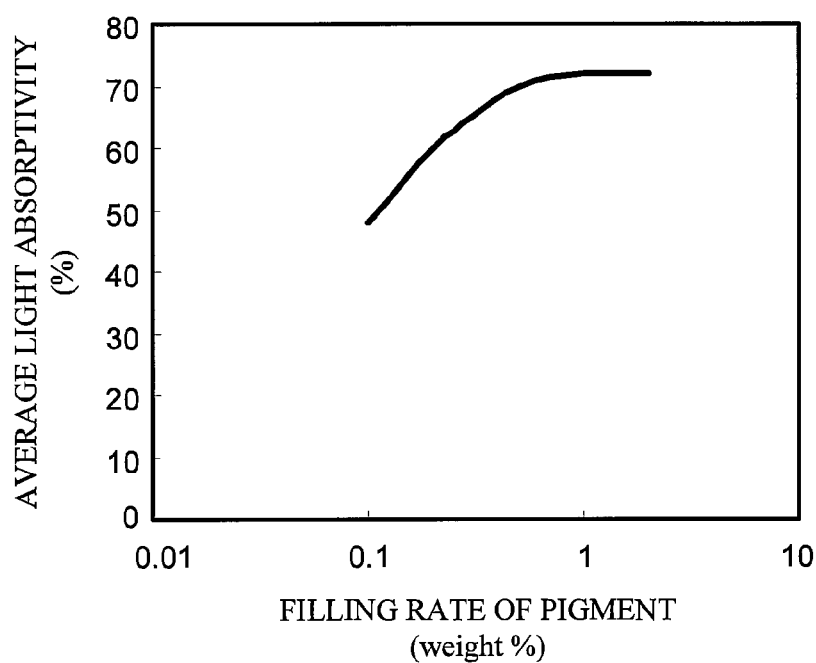
FIG. 2 shows the relationship between the filling rate and the average light absorptivity for the use of the non-black insulating pigment.

A typical relationship is shown graphically in FIG. 2 between the filling rate and the average light absorptivity for fluororesin 1 filled with non-black insulating pigment 2. This average light absorptivity is the average value over the measured wavelength region of the absorptivity in the light absorption spectrum determined from the light reflection spectrum measured on the fluororesin 1 filled with non-black insulating pigment 2. As shown in FIG. 2, the average light absorptivity increases with increasing filling rate in a filling rate range of 0.1 to 1 weight % of the insulating pigment 2, and remains almost unchanged at a filling rate greater than 1 weight %.

As noted previously, an unnecessary increase in light absorption is a cause of thermal degradation and thermal deterioration and is thus associated with an increase in the amount of wear of the insulator itself. Accordingly, with regard to the filling of the non-black insulating pigment 2 into the fluororesin 1, a filling rate no greater than 1 weight % is sufficient. On the other hand, according to the results of investigations by the present inventors, color heterogeneity and punctiform discoloration could not be prevented when the filling rate fell below 0.5 weight % (approximately 70% for the average light absorptivity). As a consequence, a filling rate of at least 0.5 weight % but no more than 1 weight % is preferred when the fluororesin 1 is filled with a non-black insulating pigment 2.

(1-2) Function and Effect

This embodiment, through the absorption by the non-black insulating pigment 2 filled at very small levels in the fluororesin 1 mainly of the light in the wavelength region that participates in interior deterioration (i.e., damaging light), can prevent a reduction in insulation performance by inhibiting the formation of carbonized material within the resin and preventing ejection of the fluororesin by gas produced in the interior.

In addition, because the non-black insulating pigment 2 used in this embodiment does not absorb much light outside the wavelength region that participates in interior deterioration, the degradation, gasification, and dissipation of resin from the insulator surface that is produced by light and heat absorption does not become unnecessarily large. As a result, decrease (wear) of the insulator as a whole can also be inhibited while achieving the suppression of interior deterioration. Since the filling rate with the non-black insulating pigment 2 is very low in this embodiment, the increase in thermal conductivity seen in filling with a substance that has a high thermal conductivity, such as boron nitride, also does not occur. This enables a reduction in the light- and heat-induced wear of the fluororesin.

In addition, since the aforementioned fluororesin is uniformly colored by the uniformly dispersed non-black insulating pigment 2, this can prevent, for example, the color heterogeneity and punctiform discoloration that can be generated when a white filler, such as boron nitride, is used. From the perspective of quality management, the result of this is that there will be little insulator that due to the presence of color heterogeneity or punctiform discoloration cannot be used in actual devices, which in turn enables facile quality control, a reduction in quality control costs, and an improve in productive efficiency. An improved consistency in product quality can therefore be envisaged. A high mechanical strength can also be maintained since the filling rate with the insulating pigment is very low.

(2) Second Embodiment

This embodiment uses a black pigment, which absorbs light over the entire wavelength range, as the pigment filled into the fluororesin 1. In this case also, just as for the first embodiment described in the preceding, the appropriate selection of the filling rate yields a highly arc-resistant insulator free of color heterogeneity and accrues both of the following effects: an inhibition of the reduction in insulating performance induced by interior carbonization and a reduction in the light- and heat-induced wear of the fluororesin 1.

(2-1) Structure

Figure 3:
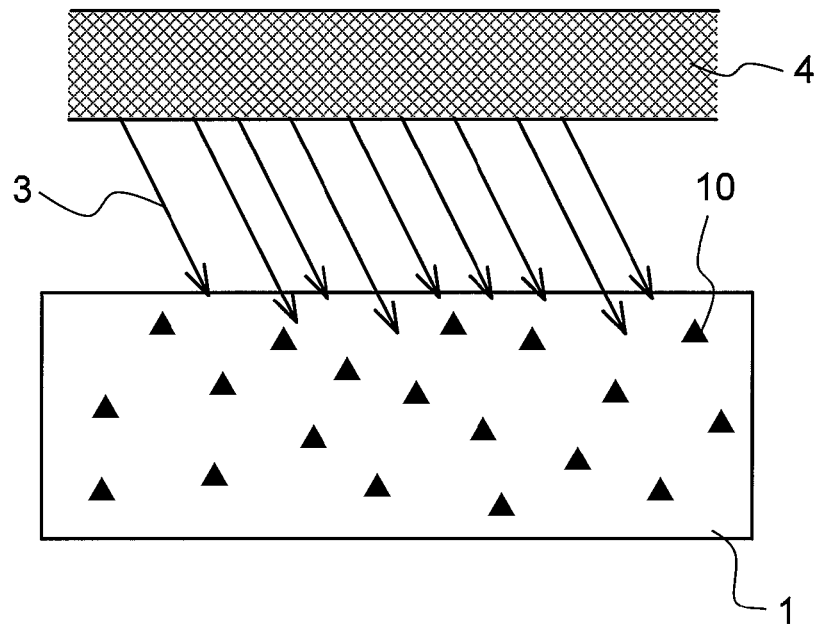
FIG. 3 is a schematic cross section that shows the structure of a second embodiment of the highly arc-resistant insulator according to the present invention.

The highly arc-resistant insulator of this embodiment, as shown in FIG. 3, comprises a fluororesin 1 filled with a black, chemical-resistant insulating pigment 10 that absorbs light over the entire wavelength region and that has a heat resistance such that discoloration does not occur when the fluororesin is baked. Again as for the first embodiment described above, polytetrafluoroethylene resin or tetrafluoroethylene-perfluoroalkyl vinyl ether copolymer is preferably used as the fluororesin. The reason for this is the same as above and will therefore not be described again.

(Black Insulating Pigment)

For example, pigment in which the main component is the $CuO$—$Cr_2O_3$ system, $CoO$—$Cr_2O_3$—$Mn_2O_3$ system, $CoO$—$Fe_2O_3$—$Cr_2O_3$ system, or $CuO$—$Fe_2O_3$—$Mn_2O_3$ system is preferably used, singly or in a combination, as the black, chemical-resistant insulating pigment 10 that has a heat resistance such that discoloration does not occur when the fluororesin is baked. These pigments are insulating pigments that have an excellent heat resistance and an excellent chemical resistance and can prevent deterioration by effectively absorbing the light that participates in interior deterioration.

(Filling Rate for Black Insulating Pigment)

The filling rate for the black insulating pigment in the fluororesin will now be considered.

Figure 4:
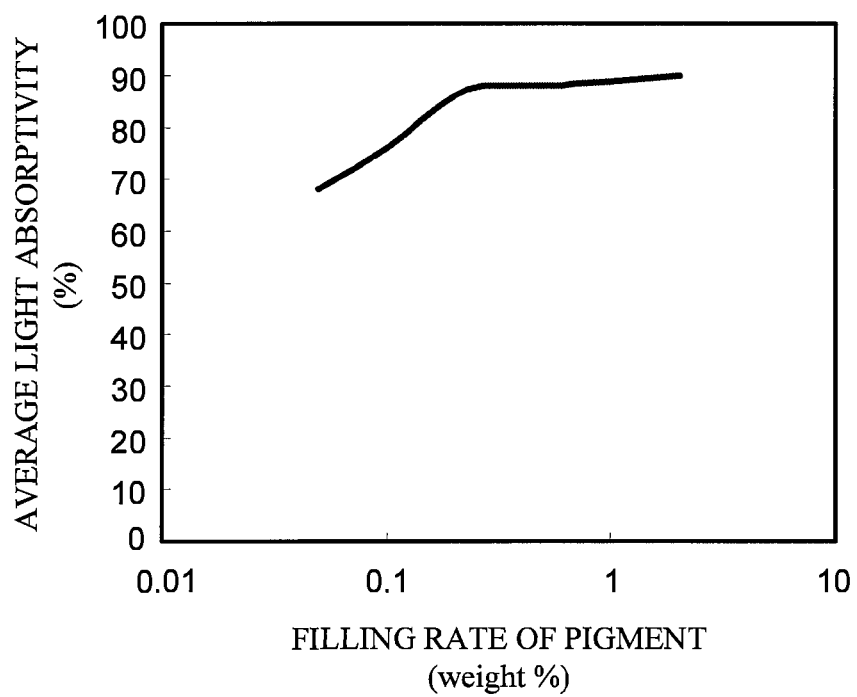
FIG. 4 shows the relationship between the filling rate and the average light absorptivity for the use of the black insulating pigment.

A typical relationship is shown in FIG. 4 between the filling rate and the average light absorptivity for fluororesin 1 filled with black insulating pigment 10. This average light absorptivity is the average value over the measured wavelength region of the absorptivity in the light absorption spectrum determined from the light reflection spectrum measured on the fluororesin 1 filled with the black insulating pigment.

As shown in FIG. 4, the average light absorptivity increases with increasing filling rate in a filling rate range for the black insulating pigment 10 of 0.05 to 0.2 weight % and remains almost unchanged at a filling rate greater than 0.2 weight %. As noted previously, an unnecessary increase in light absorption is a cause of thermal degradation thermal deterioration and is thus associated with an increase in the amount of wear of the insulator itself. Accordingly, with regard to the filling of the black insulating pigment 10 into the fluororesin 1, a filling rate no greater than 0.2 weight % is sufficient.

On the other hand, according to the results of investigations by the present inventors, color heterogeneity and punctiform discoloration could not be prevented when the filling rate fell below 0.05 weight % (approximately 70% for the average light absorptivity). As a consequence, a filling rate of at least 0.05 weight % but no more than 0.2 weight % is preferred when the fluororesin 1 is filled with a black insulating pigment 10.

(2-2) Function and Effect

The black insulating pigment 10 used in this embodiment, while absorbing light over the entire wavelength range, has an extremely small filling rate of at least 0.05 weight % but not more than 0.2 weight %, and this makes it possible to prevent unnecessary light absorption. Because of this, the degradation, gasification, and dissipation of resin from the insulator surface can be prevented and, as a result, decrease (wear) of the insulator as a whole can also be inhibited while achieving the suppression of interior deterioration. Since the filling rate with the black insulating pigment 10 is extremely low in this embodiment, the increase in thermal conductivity seen in filling with a substance that has a high thermal conductivity, such as boron nitride, also does not occur. This enables a reduction in the light- and heat-induced wear of the fluororesin.

In addition, since the aforementioned fluororesin is uniformly colored by the uniformly dispersed black insulating pigment 10, this can prevent, for example, the color heterogeneity and punctiform discoloration that are generated when a white filler, such as boron nitride, is used. From the perspective of quality management, the result of this is that there will be little insulator that due to the presence of color heterogeneity or punctiform discoloration cannot be used in actual devices, which in turn enables facile quality control, a reduction in quality control costs, and an improve in productive efficiency. An improved consistency in product quality can therefore be envisaged. A high mechanical strength can also be maintained since the filling rate for the insulating pigment is very low.

(3) Third Embodiment

This embodiment concerns an investigation into the optimal value of the particle size of the non-black insulating pigment 2 or black insulating pigment 10 to be filled in the fluororesin 1.

Evaluation parameters are available for each of the pigments described above, i.e., the "hiding power", which denotes the capacity to cover or obliterate the underlying surface when filling with a pigment is carried out, and the "tinting strength", which is the coloring capacity for the addition of a prescribed amount of pigment. The "hiding power" is determined by the light reflected by the surface of the pigment particles and the light absorbed by the pigment, and larger amounts of reflected light and absorbed light provide a higher hiding power. The hiding power is also related to the particle size of the pigment particles, and it is known that at small particle sizes, for example, at particle diameters less than or equal to one-half the wavelength of the light, the hiding power generally undergoes a substantial decline due to light scattering and diffraction phenomena that are different from reflection and refraction (refer, for example, to Non-Patent Document 1). Since the present invention is focused on the UV-visible region and the maximum wavelength for this region is 800 nm, at a minimum it is then necessary to make the particle size of the insulating pigment 400 nm (0.4 μm) or more in order to efficiently absorb light in this region.

With regard to the "tinting strength", on the other hand, smaller particle sizes provide a stronger tinting strength and the tinting strength tends to decline as the size increases. It can therefore be concluded with regard to the particle size that there is an upper limit at which the minimum required tinting strength can be exhibited. The results of extensive investigations at different particle sizes showed that an excellent hiding capacity and an excellent tinting strength can be obtained for the insulating pigment of the present invention when the average particle size is between 0.4 and 2 μm.

Moreover, it was found that, when the fluororesin 1 is filled at the filling rate cited above with green, blue, or black insulating pigment within this particle size range, the absorptivity from the arc-generated light 3 of light that participates in interior deterioration and the transmissivity for light that when absorbed is converted to thermal energy and causes insulator wear, are balanced, making it possible to obtain a highly arc-resistant insulator in which interior deterioration does not occur and for which there is also little wear. It was additionally found that the manifestation of color heterogeneity and discoloration could also be prevented due to the generation of a satisfactory coloration.

EXAMPLES

Specific examples are provided below.

The results of an investigation of the properties, e.g., volume resistivity, arc resistance, and so forth, of fluororesins filled with different insulating pigments are shown in Table 1. Examples 1 to 4 are examples according to the present invention, wherein Examples 1 and 2 concern filling with a green insulating pigment, Example 3 concerns filling with a blue insulating pigment, and Example 4 concerns filling with a black insulating pigment. Comparative Example 1 concerns filling with carbon, an electroconductive material, while Comparative Example 2 concerns unfilled tetrafluoroethylene resin (PTFE). The arc resistance test was in accordance with the method described in JIS K 6911.

ductive material (carbon) was filled, as shown in Comparative Example 1. In contrast to this, when filling was carried out using an insulating inorganic pigment according to the present invention, as in Examples 1 to 4, a high volume resistivity was obtained while the arc resistance could also be maintained at the same level as for the unfilled tetrafluoroethylene resin (PTFE) that was the subject of Comparative Example 2.

The results of an investigation of the presence/absence of interior deterioration during exposure to arc light and the weight wear during this exposure are shown in Table 2 for tetrafluoroethylene resin (PTFE) filled with different insulating pigments. Examples 11 to 18 are examples according to the present invention, wherein Examples 11 to 13 concern filling with a green insulating pigment, Examples 14 and 15 concern filling with a blue insulating pigment, and Examples 16 to 18 concern filling with a black insulating pigment. Comparative Example 11 concerns unfilled tetrafluoroethylene resin (PTFE). The "weight wear" is reported as a relative value where 100 is assigned to the weight wear per unit energy of the tetrafluoroethylene resin (PTFE) not filled with insulating resin, which is the subject of Comparative Example 11.

TABLE 1

| | filler | color | resin | filling rate (weight %) | Volume resistivity ($\Omega \cdot cm$) | arc resistance (seconds) |
|---|---|---|---|---|---|---|
| Example 1 | $TiO_2$—CoO—NiO—ZnO system | green | tetrafluoroethylene-perfluoroalkyl vinyl ether copolymer | 0.7 | $1 \times 10^{17}$ | $\geqq 270$ |
| Example 2 | $TiO_2$—CoO—NiO—ZnO system | green | tetrafluoroethylene | 0.7 | $2 \times 10^{17}$ | $\geqq 270$ |
| Example 3 | CoO—$Al_2O_3$—$Cr_2O_3$ system | blue | tetrafluoroethylene | 0.7 | $2 \times 10^{17}$ | $\geqq 270$ |
| Example 4 | CuO—$Cr_2O_3$ system | black | tetrafluoroethylene | 0.4 | $2 \times 10^{17}$ | $\geqq 270$ |
| Comparative Example 1 | carbon | | tetrafluoroethylene | 0.4 | $2 \times 10^{12}$ | 180 |
| Comparative Example 2 | none | | tetrafluoroethylene | 0 | $1 \times 10^{18}$ | $\geqq 270$ |

As is clear from Table 1, the volume resistivity and arc resistance were substantially reduced when an electrocon-

TABLE 2

| | filler | color | filling rate (weight %) | particle size (μm) | presence/absence of interior carbonization tracks | wear |
|---|---|---|---|---|---|---|
| Example 11 | $TiO_2$—CoO—NiO—ZnO system | green | 0.5 | 0.01 | present (small number) | 100 |
| Example 12 | $TiO_2$—CoO—NiO—ZnO system | green | 0.5 | 1.3 | absent | 100 |
| Example 13 | ZnO—CoO system | green | 1.0 | 0.6 | absent | 150 |
| Example 14 | CoO—$Al_2O_3$ system | blue | 0.5 | 0.6 | absent | 110 |
| Example 15 | CoO—$Al_2O_3$—$Cr_2O_3$ system | blue | 0.5 | 0.6 | absent | 110 |
| Example 16 | CuO—$Cr_2O_3$ system | black | 0.2 | 0.6 | absent | 250 |
| Example 17 | CuO—$Cr_2O_3$ system | black | 0.07 | 0.6 | absent | 130 |
| Example 18 | CoO—$Cr_2O_3$—$Mn_2O_3$ system | black | 0.1 | 0.3 | present (small number) | 150 |
| Comparative Example 11 | none | | 0 | — | present (large number) | 100 |

As is made clear from Table 2, when, for the case of filling with a non-black insulating pigment (Examples 11 to 15), the filling rate was around 0.5 weight % and the average particle size was in the range of 0.4 to 2 μm, interior carbonization and the associated tetrafluoroethylene resin erosion did not occur, while the wear could be brought to about that of the system, provided as Comparative Example 11, not filled with insulating pigment. In addition, interior carbonization tracks were seen in Example 11, where the particle size was small at "0.01 μm", and the wear was high at "150" in Example 13, where the filling rate was high at "1.0".

Upon comparing the results from Examples 16 and 17, which used the same black insulating pigment at a filling rate of "0.2" and "0.07", respectively, Example 16 had a high wear of "250". It may be understood from this that a rationalization of the filling rate for filling with a black insulating pigment makes it possible to also bring down the amount of wear while inhibiting interior carbonization. On the other hand, interior carbonization tracks were seen in Example 18, in which the particle size was small at "0.3" μm.

As is clear from the preceding results, the highly arc-resistant insulator of the present invention, by filling a fluororesin with a suitable amount of an appropriate insulating pigment, can avoid the interior carbonization caused by the arc light while, by avoiding the absorption of excess light and heat from the arc, can also suppress insulator wear. In addition, by suppressing color heterogeneity and so forth by imparting color, the color heterogeneity and localized discoloration produced by mixing precursors from different lots or by baking can be prevented and the consistency of product quality can then be improved.

The results are shown in Table 3 for investigations in which nozzles for the arc-extinguishing chamber of a circuit breaker were fabricated from tetrafluoroethylene resin (PTFE) filled with different insulating pigments and the wear rate was investigated during the execution of interrupt tests. Examples 21 to 24 are examples according to the present invention, wherein Example 21 concerns filling with a green insulating pigment, Examples 22 and 23 concern filling with a blue pigment, and Example 24 concerns filling with a black insulating pigment. Comparative Example 21 concerns filling with $MoS_2$, an electroconductive substance; Comparative Example 22 concerns filling with alumina $Al_2O_3$; Comparative Example 23 concerns filling with a very small amount (3%) of boron nitride (BN); and Comparative Example 24 concerns the unfilled tetrafluoroethylene resin (PTFE). The "wear rate" was determined by dividing the loss in the nozzle throat diameter and the loss in weight by the introduced energy and is reported as the relative value where "100" is the wear rate for filling with boron nitride BN, which is the subject of Comparative Example 23.

TABLE 3

| | filler | color | filling rate (weight %) | wear rate diameter | wear rate weight |
|---|---|---|---|---|---|
| Example 21 | $TiO_2$—CoO—NiO—ZnO | green | 0.60 | 120 | 100 |
| Example 22 | CoO—$Al_2O_3$—$Cr_2O_3$ | blue | 0.60 | 120 | 100 |
| Example 23 | CoO—$Al_2O_3$ | blue | 0.60 | 160 | 110 |
| Example 24 | CuO—$Cr_2O_3$ | black | 0.17 | 210 | 230 |
| Comparative Example 21 | $MoS_2$ | | <0.2 | 300 | 370 |
| Comparative Example 22 | $Al_2O_3$ | | 7 | 120 | 100 |
| Comparative Example 23 | BN | | 3 | 100 | 100 |
| Comparative Example 24 | none | | 0 | 60 | 110 |

As is clear from Table 3, when the wear rates are compared, the wear rate for the nozzle throat diameter and the weight wear rate are both substantially lower in Examples 21 to 24 than in Comparative Example 21, in which filling is carried out with the electrically conductive material, $MoS_2$. In particular, the weight wear rate in Examples 21 to 23 is reduced to the same level as in Comparative Example 23, which concerns filling with a very small amount (3%) of BN, and Comparative Example 24 (no filling).

Figure 7:
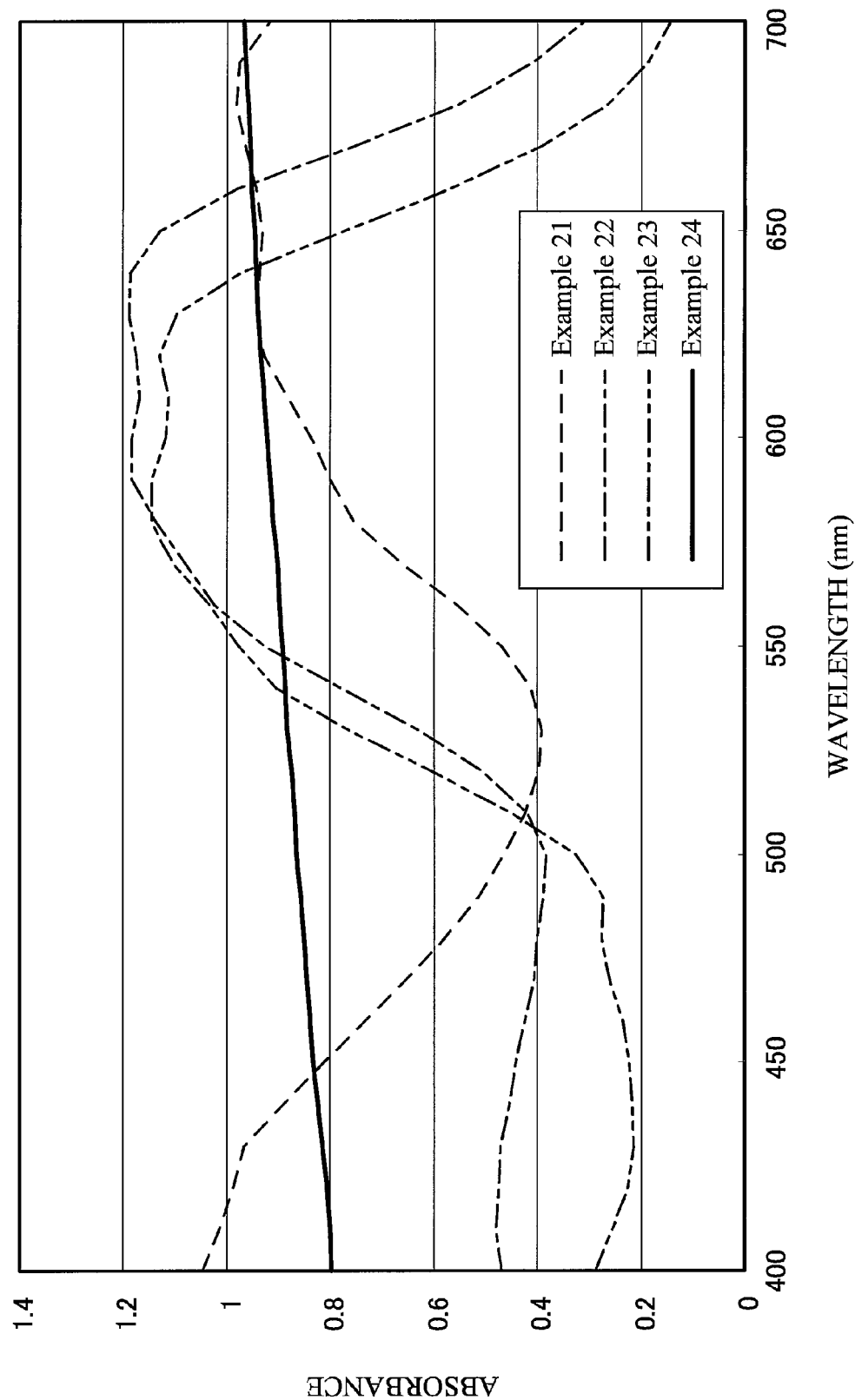
FIG. 7 shows the light absorption spectra for the examples shown in Tables 3 and 4.
Figure 8:
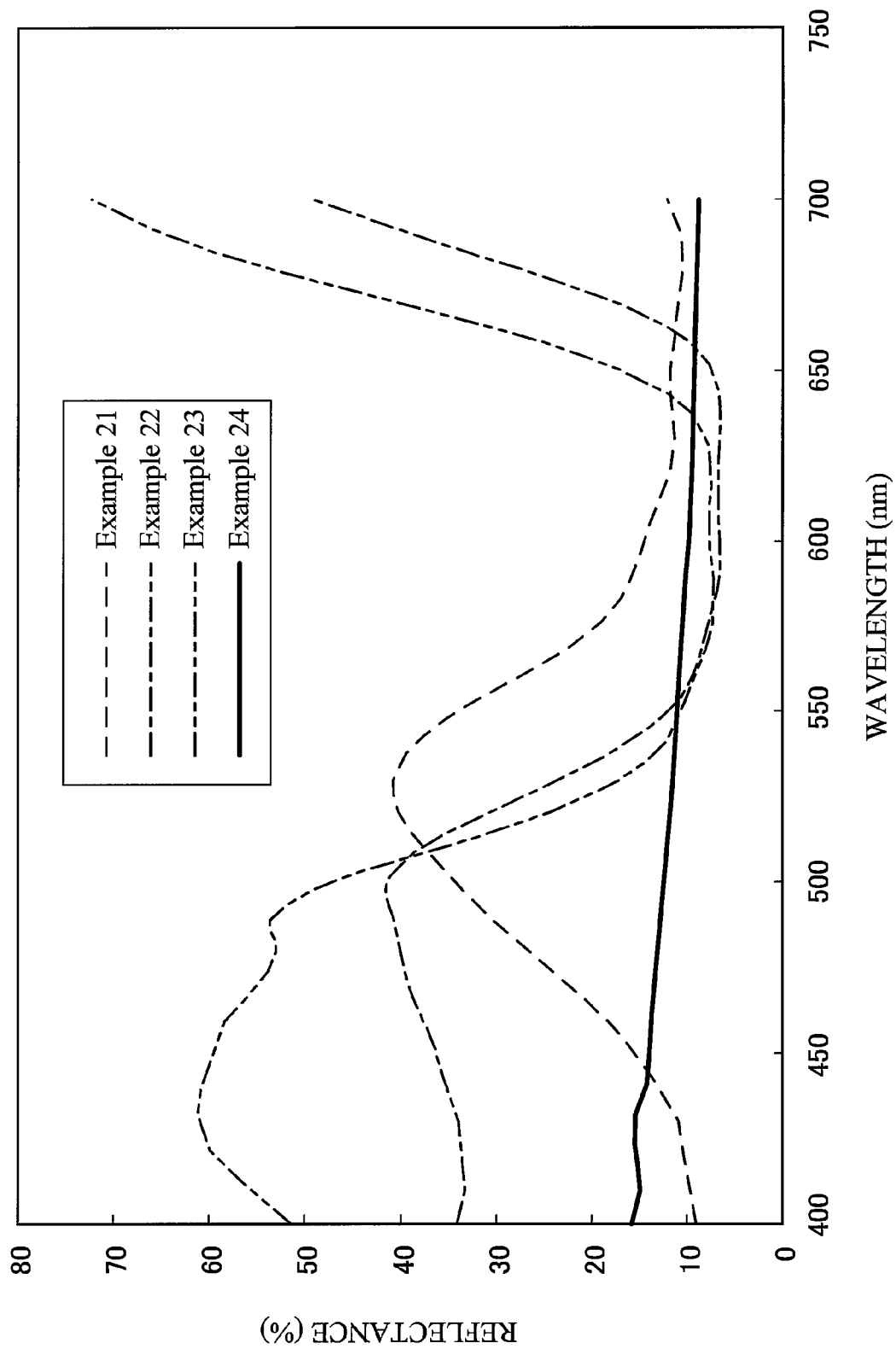
FIG. 8 shows the light reflection spectra for the examples shown in Tables 3 and 4.

The results of an investigation are shown in Table 4 into the absorbance area in the 400 to 700 nm wavelength region for the Examples 21 to 24 shown in Table 3. The relationships between the absorbance area at 500 to 550 nm and the wear rates (relative value if 100 is used as the value in Comparative Example 23) for the Examples 21 to 24 shown in Tables 3 and 4 are shown graphically in FIGS. 5 and 6. The light absorption spectra for Examples 21 to 24 and the light reflection spectra for Examples 21 to 24 are shown in FIGS. 7 and 8, respectively. The absorbance area values that are the subject of FIGS. 5 and 6 are derived based on the light absorption spectra shown in FIG. 7.

TABLE 4

| | filler | absorbance area | | | | | | |
|---|---|---|---|---|---|---|---|---|
| | | wavelength region (nm) 400 to 450 | wavelength region (nm) 450 to 500 | wavelength region (nm) 500 to 550 | wavelength region (nm) 550 to 600 | wavelength region (nm) 600 to 650 | wavelength region (nm) 650 to 700 | wavelength region (nm) 400 to 700 |
| Example 21 | $TiO_2$—CoO—NiO—ZnO | 48 | 31 | 21 | 34 | 46 | 48 | 228 |
| Example 22 | CoO—$Al_2O_3$—$Cr_2O_3$ | 23 | 20 | 30 | 55 | 59 | 34 | 221 |
| Example 23 | CoO—$Al_2O_3$ | 12 | 13 | 34 | 55 | 53 | 19 | 185 |
| Example 24 | CuO—$Cr_2O_3$ | 41 | 42 | 44 | 45 | 47 | 48 | 267 |

Figure 5:
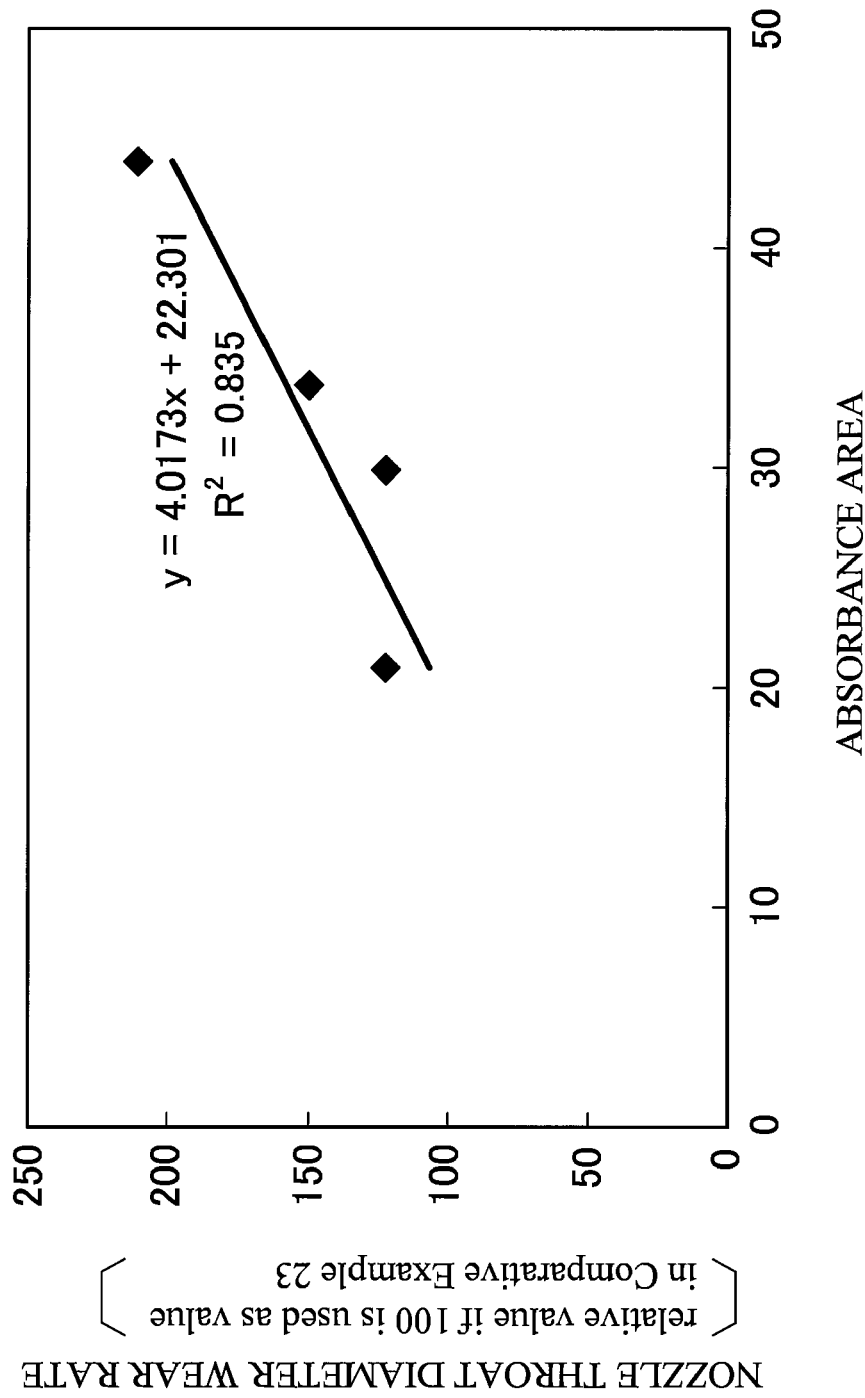
FIG. 5 is a graphical representation of the relationship between the absorbance area in the 500 to 550 nm wavelength region and the nozzle throat diameter wear rate for the examples shown in Tables 3 and 4.
Figure 6:
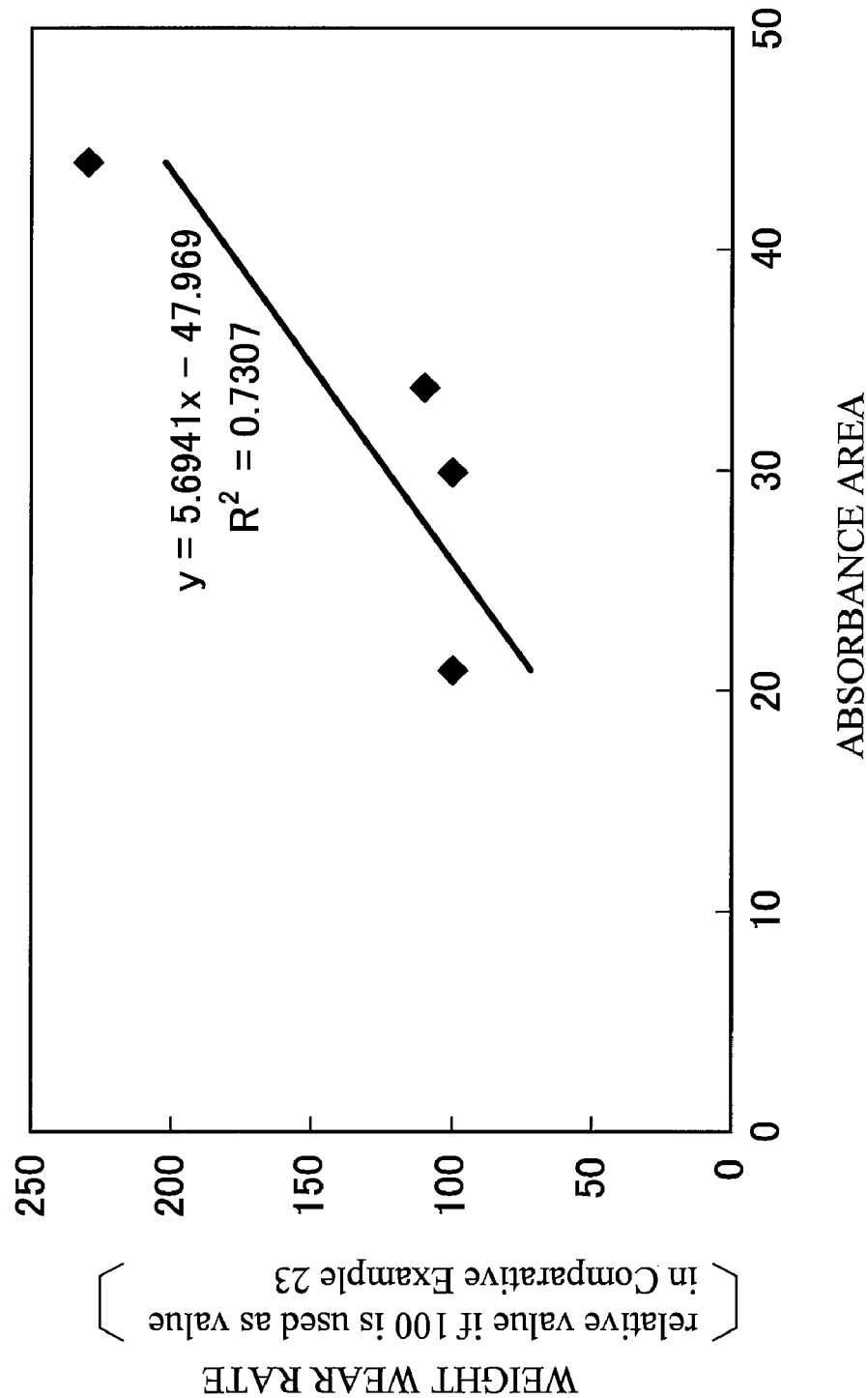
FIG. 6 is a graphical representation of the relationship between the absorbance area in the 500 to 550 nm wavelength region and the weight wear rate for the examples shown in Tables 3 and 4.

As is clear from Table 4 and FIGS. 5 and 6, a fixed relationship exists between the wear rate and the absorbance area. On the other hand, as shown in FIG. 7, the difference in absorbance in the 400 to 450 nm wavelength range is found to have almost no influenced on the wear rate. Accordingly, by carrying out an evaluation of the wear rate for filling with different insulating pigments at different filling rates and an evaluation of the absorbance area taking into consideration the wavelength region or regions that have no influence on the wear rate, it is possible to optimize the hue (absorption wavelength) of the pigment to be introduced and the color density (filling rate).

The invention claimed is:

1. A highly arc-resistant insulator that is disposed and used in a vicinity of arcing that is generated between electrodes, the insulator comprising:

a prescribed fluororesin filled with 0.5 to 1 weight % of a non-black insulating pigment that has a heat resistance such that discoloration does not occur when the fluororesin is baked, wherein the fluororesin is a polytetrafluoroethylene resin, and wherein the non-black insulating pigment is a pigment whose main component is a $TiO_2$—$CoO$—$NiO$—$ZnO$ system green insulating pigment, and wherein a hue (absorption wavelength) and a color density (filling rate) of the insulating pigment are optimized as a result of carrying out an evaluation of a wear rate for different insulators which are filled with different insulating pigments at different filling rates, and an evaluation of an absorbance area thereof taking into consideration a wavelength region or regions that have no influence of the wear rate.

2. The highly arc-resistant insulator according to claim 1, wherein the average particle size of the insulating pigment is 0.4 to 2 μm.

* * * * *